United States Patent
Barnett

(10) Patent No.: US 7,185,744 B2
(45) Date of Patent: Mar. 6, 2007

(54) DOUBLE WHEEL CHOCK FRAME

(75) Inventor: Ralph Lipsey Barnett, Wilmette, IL (US)

(73) Assignee: Triodyne Safety Systems, L.L.C., Northbrook, IL (US)

( * ) Notice: Subject to any disclaimer, the term of this patent is extended or adjusted under 35 U.S.C. 154(b) by 0 days.

(21) Appl. No.: 11/010,818

(22) Filed: Dec. 13, 2004

(65) Prior Publication Data

US 2005/0167209 A1 Aug. 4, 2005

(51) Int. Cl.
*B60T 1/14* (2006.01)
(52) U.S. Cl. ............... 188/5; 188/7; 188/36; 180/9.1; 104/165; 104/162; 104/172.3
(58) Field of Classification Search ............ 188/5, 188/7, 36; 104/165, 162, 172.3
See application file for complete search history.

(56) References Cited

U.S. PATENT DOCUMENTS

| 4,121,788 | A | * | 10/1978 | McMahon | 244/50 |
| 4,674,929 | A | * | 6/1987 | Blunden | 410/30 |
| 4,679,974 | A | * | 7/1987 | Blunden | 410/30 |
| 4,836,337 | A | * | 6/1989 | Borrelli | 188/32 |
| 4,836,726 | A | * | 6/1989 | Robertson et al. | 410/9 |
| 5,037,255 | A | * | 8/1991 | Bullock et al. | 410/30 |
| 5,492,436 | A | * | 2/1996 | Suksumake | 405/201 |
| 6,425,465 | B1 | * | 7/2002 | Tallman et al. | 188/32 |
| 6,581,525 | B2 | * | 6/2003 | Smith | 104/96 |
| 2005/0034934 | A1 | * | 2/2005 | Horton | 188/36 |
| 2005/0284707 | A1 | * | 12/2005 | Morris et al. | 188/36 |

OTHER PUBLICATIONS

*Roller Skids*, Mark Series specification sheets (2 pages), MULTITON, Sep. 2001.
*Hevi-Haul Standard Skates*, company brochure (8 pages), Hevi-Haul Litho, U.S.A. (2000).
*Hilman Rollers*, NYTON/ERS/FT Series specification sheets (8 pages), Hilman, Incorporated, 1999.
*Hilman Rollers, Move the Heavyweights* specifications sheets (6 pages), Hilman Rollers, 1998.
*Just In Case! Deluxe Kits from Hilman Rollers* (2 pages).
*Hilman Rollers, website* (2 pages) 2001.
*Hilman Rollers, Load Rollers for Industrial and Contractor Heavy Moving* specification sheets (8 pages), Hilman, Incorporated, 1999.
*Limited Movement Machinery Roller Devices* (Draft), ASME International Mechanical Engineering Congress, p. 1-10, 2004.

* cited by examiner

*Primary Examiner*—Lesley D. Morris
*Assistant Examiner*—Marlon Arce-Diaz
(74) *Attorney, Agent, or Firm*—Pauley Petersen & Erickson

(57) ABSTRACT

A roller system for moving a load a predetermined distance includes a chock frame having a pair of spaced chocks connected between a pair of rigid siderails and a freely moveable roller unit. The roller unit includes a plurality of rollers and is positioned between the siderails and freely moveable between the pair of spaced chocks. The load may then be moved in inchmeal fashion by slowly advancing the roller unit while shuffling the chock frame on the ground at a similar pace.

20 Claims, 5 Drawing Sheets

DOUBLE WHEEL CHOCK FRAME

BACKGROUND OF THE INVENTION

1. Field of the Invention

This invention relates to limiting the movement of loading moving roller systems using a frame for safely and predictably moving large loads.

2. Description of Related Art

Ancient Egyptians allegedly moved large stone blocks by placing cylindrical rollers beneath them and then manually urging the blocks along. This rolling procedure required that the rollers emerging from the rear of the stone be manually lifted and replaced in front. This roller replacement protocol has been automated in commercially available roller units that allow continuous movement of heavy machinery under the action of pry bars, come-a-longs, winches, or manual push efforts. Unfortunately, when slopes or asperities are encountered, these heavy loads may accelerate uncontrollably or steer themselves in unsafe directions when the roller units become reoriented. It is therefore desirable to cause the locomotion of the machinery in inchmeal fashion by intermittently braking the system while the roller units are manually reset.

A typical roller unit is illustrated in FIGS. 1 and 2 where cylindrical rollers are mounted along a roller chain that circulates around a load bearing platform that supports a superstructure which in turn upholds a heavy machine. These roller units are often referred to as roller skids or skates. The rollers transfer compression loads between the ground surface and the bottom of the load bearing platform. Off-the-shelf units are available in capacities from 4 tons to 100 tons. Roller units are typically symmetrical longitudinally and transversely.

Existing roller systems typically use four roller units which are inserted beneath a load, such as a boiler, by jacking up the corners or other hard points. The roller units are seldom attached to the boiler which may be propelled by horizontal forces generated by shoving, winching, or prying. The boiler is steered by rotating the individual roller units about an imaginary vertical axis. This is generally accomplished manually using a three to five foot long lever with a T-bar handle. The steering lever is temporarily affixed to either end of the roller unit. A swivel bearing is sometimes added to the top of the roller unit to minimize rotational resistance and improve its steering capability.

Moving large masses on horizontal homogenous surfaces that are free of asperities may be safely accomplished by any horizontal force system that may be instantaneously interrupted, e.g., manual pushing or pry bars. As ideal conditions degenerate the following may be experienced: sloped surfaces, ramps, and inclines; textured and anisotropic surfaces (broom finished concrete); nonhomogeneous floors composed of multiple materials (brick, wood, steel, etc.); weak floor spots, expansion joints and drains; uneven surfaces; and/or dirty and debris laden floors.

When significant slopes are encountered, heavy loads may accelerate uncontrollably and this action may be exacerbated by spring-like propelling devices such as come-a-longs or winches. Roller manufacturers generally recommend that holdback devices be used on inclined surfaces. Surface imperfections generally contribute to the propensity of roller units to realign themselves and steer the moving machinery in unsafe directions. To help maintain control of the loads, roller manufacturers generally advocate the following precautions: constant monitoring of the rollers; moving slowly at all times; and absolute cleanliness of moving surfaces.

It is not unusual for movers to rig machinery with various winch-like devices to control their movement. Under general conditions, such as an elephant on an icy slope as shown in FIG. 3, holdback rigging is not elementary. There are fundamental difficulties with existing holdback technology. For example, when simultaneously pulling and holding back with two come-a-longs, the cables must be collinear; otherwise, a moment is introduced that will tend to rotate the elephant. If three nonparallel cables are used to restrain the beast, their lines of action must all intersect at a point; otherwise once again, they will rotate the elephant. The four cables shown in FIG. 3 completely fix the position of the elephant against rotation and translation. On the other hand, loosening and tightening the cables to cause the creature to move along a desired path in a specific orientation is a daunting exercise. It should be noted that some four-line rigging systems will not fully restrain a load. In addition, the location and structural integrity of available tie off points cannot be taken for granted.

SUMMARY OF THE INVENTION

A typical roller device for moving a load includes a roller unit having a load bearing surface and a plurality of connected rollers. Accordingly, a load is placed on the load bearing surface and the roller device is used to move the load to a desired location.

According to this invention, a device to enforce intermittent motion, the double wheel chock frame, may be used in connection with the roller unit. A chock frame according to this invention preferably includes a pair of spaced chocks connected between a pair of preferably rigid siderails. The roller unit may be positioned between the siderails and is freely moveable between the pair of spaced chocks.

The siderails are preferably spaced approximately equal to a width of the roller unit. The pair of spaced chocks may include a fixed chock and an adjustable chock. The adjustable chock is preferably adjustable within the siderails to form a suitably spaced central rattle void. The roller unit is then freely moveable in a longitudinal direction within the rattle void.

In operation, the chock frame surrounds the roller unit with a preset rattle space or void fore and aft. The roller unit may move forward or rearward until the leading cylindrical roller of the plurality of rollers rolls into contact with the vertical face of the chock. One roller will push the chock frame forward while the chain lowers an adjacent roller on top of the chock. This action locks up all rollers within the roller unit and produces a braking action.

When the double wheel chock frame just begins to move, the operator may kick the frame forward the full preset distance. The locomotion of the roller system may then continue until the rattle space has once again been consumed. Any time the orientation of the roller unit needs adjustment, a T-handled lever may be applied to the roller unit. As the roller unit is rotated, the siderails of the wheel chock frame will cause the frame to rotate and adopt the roller unit's new orientation. By shuffling the double wheel chock frame along, a continuous movement of the load may be achieved while insuring that any runaway excursion will be interrupted within a few inches. If the frame is not shuffled forward in a timely fashion and a cylindrical roller is allowed to climb on top of it, kicking the frame forward will not be possible. The trapped frame may be released by moving the roller system slightly rearward. If this is not practical, the entire roller unit and wheel chock frame may be rotated 180 degrees using the T-handled lever. After rotation, locomotion may be resumed.

BRIEF DESCRIPTION OF THE DRAWINGS

These and other objects and features of this invention will be better understood from the following descriptions taken in conjunction with the drawings wherein.

DETAILED DESCRIPTION OF THE PREFERRED EMBODIMENTS

Figure 4A:
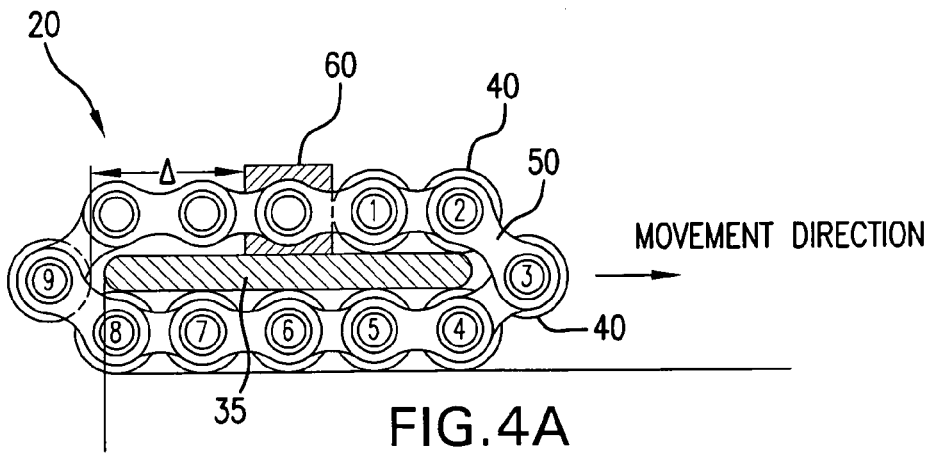
FIG. 4A is a schematic side view of a limited movement roller device in a first, beginning position, according to one preferred embodiment of this invention.
Figure 4B:
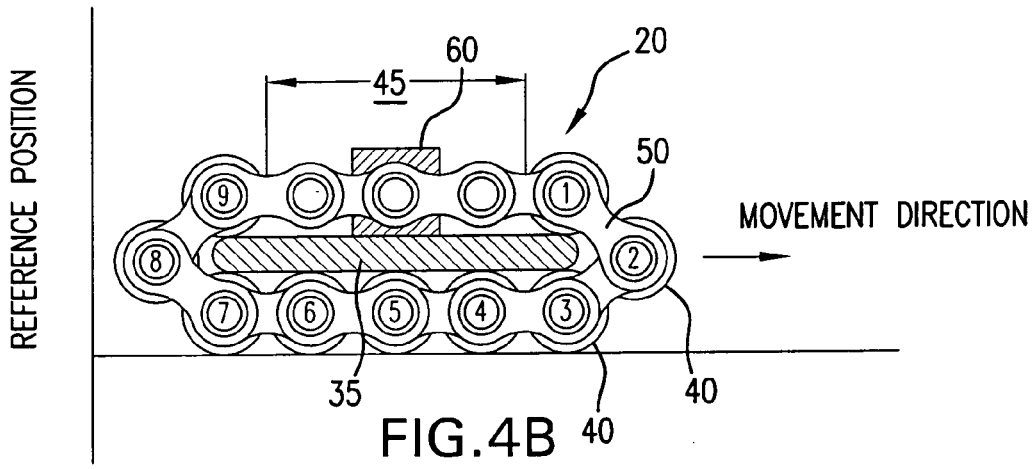
FIG. 4B is a schematic side view of the limited movement roller device shown in FIG. 4A in a second intermediate position, according to one preferred embodiment of this invention.
Figure 4C:
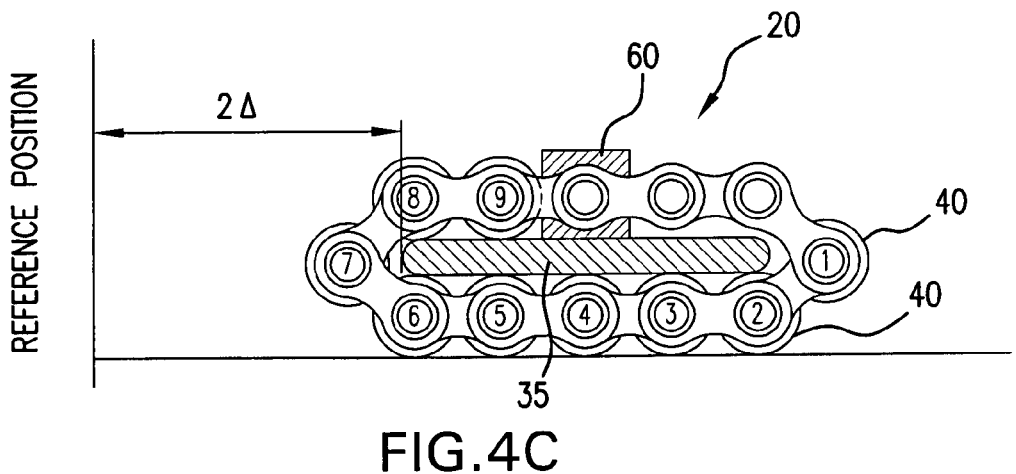
FIG. 4C is a schematic side view of the limited movement roller device shown in FIG. 4A in a third and final position, according to one preferred embodiment of this invention.
Figure 5:
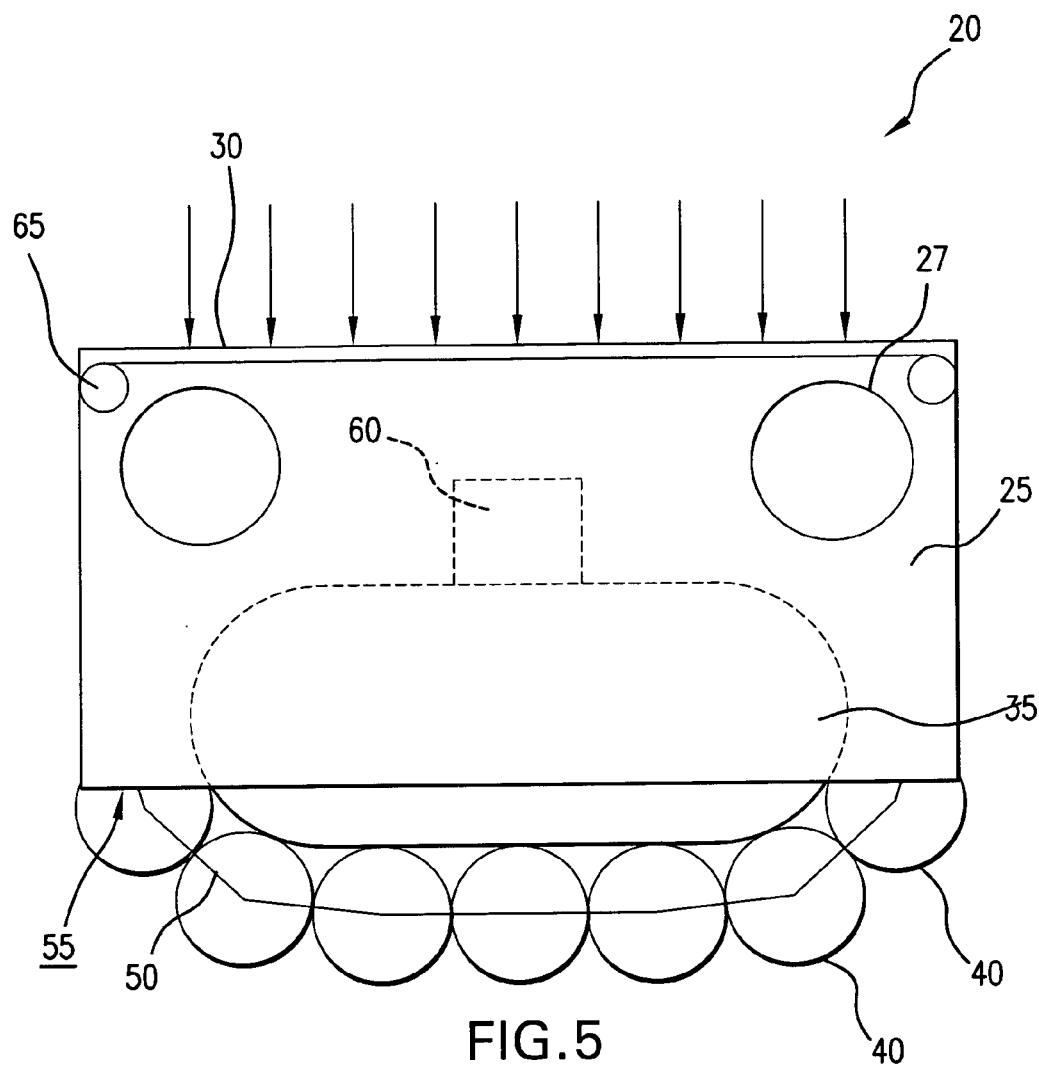
FIG. 5 is a schematic cutaway side view of a limited movement roller device according to one preferred embodiment of this invention.
Figure 6:
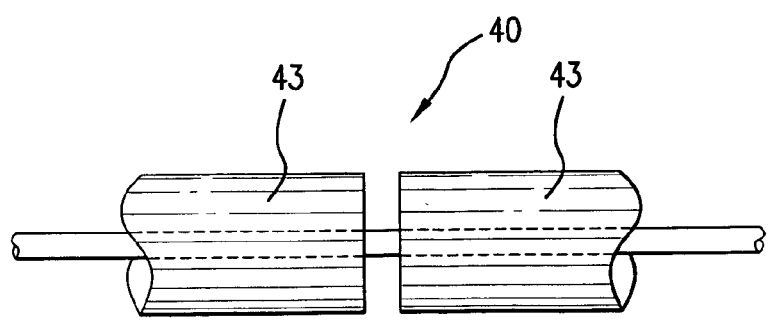
FIG. 6 is a front view of a split roller arrangement according to one preferred embodiment of this invention.

FIGS. 4–10 show various embodiments of limited movement roller systems according to preferred embodiments of this invention. FIGS. 4–6 show various preferred embodiments of a limited movement roller device 20 and FIGS. 7–10 show various preferred embodiments of a double wheel chock frame 80. The devices as described herein may be used independently of each other or in combination with each other.

Limited Movement Roller Device

FIGS. 4 and 5 show a limited movement roller device 20 for moving a load according to preferred embodiments of this invention. Limited movement roller device 20 preferably includes frame 25 having load bearing surface 30. Frame 25 is preferably manufactured of steel or other material having the strength and durability to withstand heavy loads and repeated loading and unloading. Accordingly, a load is placed on load bearing surface 30 and limited movement roller device 20 is used to move the load to a desired location.

According to one preferred embodiment of this invention, frame 25 further includes platform 35 positioned within frame 25. Platform 35 is integrated or otherwise positioned within frame 25 to absorb heavy loading cycles.

A plurality of rollers 40 are moveable within frame 25. Each roller 40 of the plurality of rollers 40 are preferably connected with respect to each other. Rollers 40 are preferably cylindrical and generally solid around a respective axle. An opening 55 formed in a lower surface of frame 25 permits a portion of the plurality of rollers 40 to contact a ground surface and thus provide transfer of compression loads between the ground surface and a bottom of platform 35.

According to one preferred embodiment of this invention, the plurality of rollers 40 are connected within a continuous chain 50. Continuous chain 50 preferably extends around platform 35. Continuous chain 50 maintains a desired spacing and position of each roller 40 relative to each other roller 40 within limited movement roller device 20.

As best shown in FIGS. 4A–4C, limited movement roller device 20 further includes stop block 60 positioned to obstruct continuous motion of the plurality of rollers 40 around platform 35 or otherwise obstruct movement of the plurality of rollers 40 through frame 25. Stop block 60 is preferably positioned within void 45 of continuous chain 50 between two void delimiting rollers 40. Void 45 thereby defines a range of limited movement for roller device 20 in a single forward and back direction. For stop block 60, a travel interval of limited movement roller device 20 may be selected by adjusting a width of stop block 60 and/or the number of rollers 40 removed from chain 50. In FIG. 4, it is indicated that a maximum clearance between rollers 40 and stop block 60 is half the corresponding movement of limited movement roller device 20.

As such, in one preferred embodiment of this invention, void 45 may be defined by the removal of one or more rollers 40 within chain 50. Therefore, a user may define the moveable distance of limited movement roller device 20 by adding or removing rollers 40 from chain 50 and/or by increasing or decreasing a width of stop block 60. Heavy loads may require a very short distance and hence removal of only one or two rollers 40 from chain 50 while lighter, more maneuverable loads may permit removal of three or four rollers 40 from chain 50.

As shown in FIGS. 4A–4C and described, in operation the plurality of rollers 40 move around at least a portion of a perimeter of platform 35, wherein stop block 60 is positioned on top of platform 35 and the plurality of rollers 40 that are operable to move limited movement roller device 20 are positioned beneath platform 35.

Load bearing surface 30 positioned on frame 25 is preferably configured to permit rotation between the load and limited movement roller device 20. Preferably, a swivel or rotation means is attached with respect to load bearing surface 30 for enabling rotation of limited movement roller device 30 relative to the load. For instance, load bearing surface 30 may include bearing 65 connected with respect to load bearing surface 30 for enabling a rotational motion of load bearing surface 30.

Rollers 40 and chain 50 may comprise roller units manufactured by Hilman Incorporated which may be used in connection with the described invention. Such roller units provide drag coefficients for both breakaway and dynamic conditions that are approximately 2% at capacity loading. The roller units addressed in this application resist vertical loads by direct diametrical compression of solid cylinders. Alternate roller skid designs employ wheels, as in children's roller skates; their structural integrity is limited by the shear strength of their axles. Diametrical compression is the superior concept for heavy loads.

According to one preferred embodiment of this invention, each roller 40 comprises a split roller 43 arrangement, such as shown in FIG. 6. Split rollers 43 are particularly useful for very heavy loads because rotation of limited movement roller device 20 is easier. When limited movement roller device 20 is rotated, split roller 43 arrangement causes one roller of split rollers 43 to rotate clockwise and the other roller of split rollers 43 to rotate counterclockwise thereby facilitating rotation.

As described in more detail below, limited movement roller device 20 may be used alone, in combination with one or more other limited movement roller devices 20 and/or in combination with chock frame 80, another embodiment of the invention, as further described below.

To maintain control of a roller system affecting the movement of a large load, a user may proceed incrementally in inchmeal fashion. Every few inches limited movement roller device 20 can be forced into a braking mode which must be manually reset to resume another few inches of movement. FIG. 4A illustrates a roller unit which has been modified by removing one or more rollers from the top of platform 35 and replacing them with stop block 60 fixed to platform 35. Limited movement roller device 20 has been advanced to the right in FIG. 4B where roller number 1 has moved away from stop block 60 and roller number 9 has moved closer to stop block 60. Further motion of the limited movement roller device 20 causes roller number 9 to contact stop block 60 which terminates all revolving of rollers 40 as shown in FIG. 4C. Limited movement roller device 20 thereby experiences full friction braking. Further locomotion of rollers 40 requires that limited movement roller device 20 be rotated approximately 180° using a lever, such as a standard steering lever or a pry bar. After limited movement roller device 20 has been turned around, the number 9 roller takes the original position of the number 1 roller and locomotion continues.

According to one preferred embodiment of this invention, such as shown in FIG. 5, at least one aperture 27 is formed in frame 25 and is engageable with a steering bar for moving limited movement roller device 20 and the load, particularly around 180° of rotation as described above. Following rotation, limited movement roller device 20 may continue movement in the desired direction until full friction braking is again obtained. This process may be repeated until the load is in the desired location.

Double Wheel Chock Frame

Figure 1:
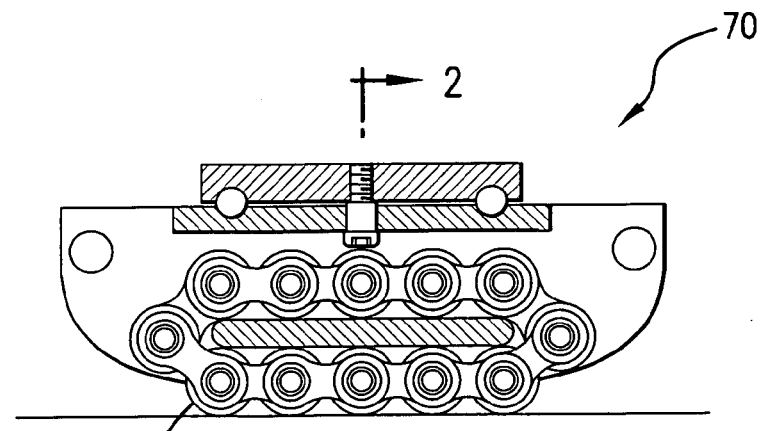
FIG. 1 is a schematic cutaway side view of a prior art roller unit.
Figure 2:
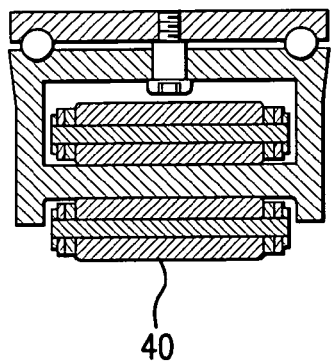
FIG. 2 is a schematic cutaway front view of the prior art roller unit shown in FIG. 1.
Figure 3:
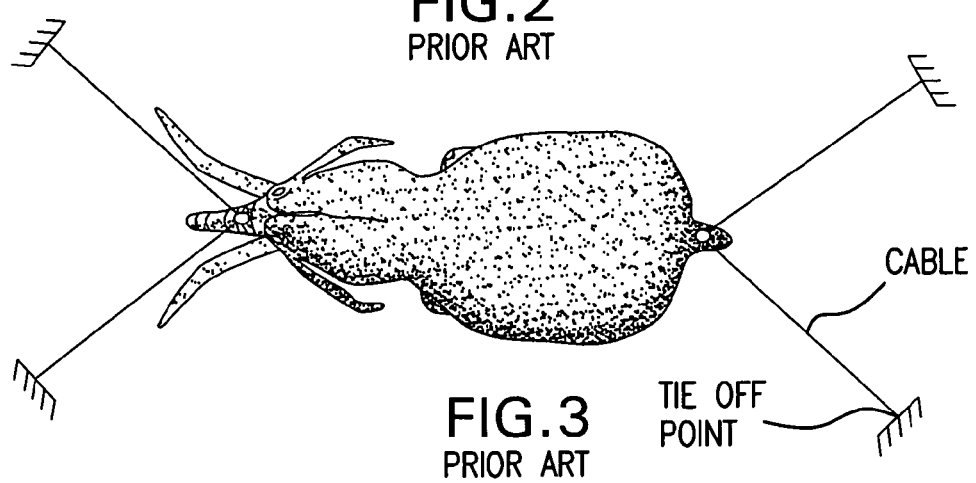
FIG. 3 is a schematic top view of a prior art four-cable rigging system, specifically shown moving an elephant along an icy surface.
Figure 7:
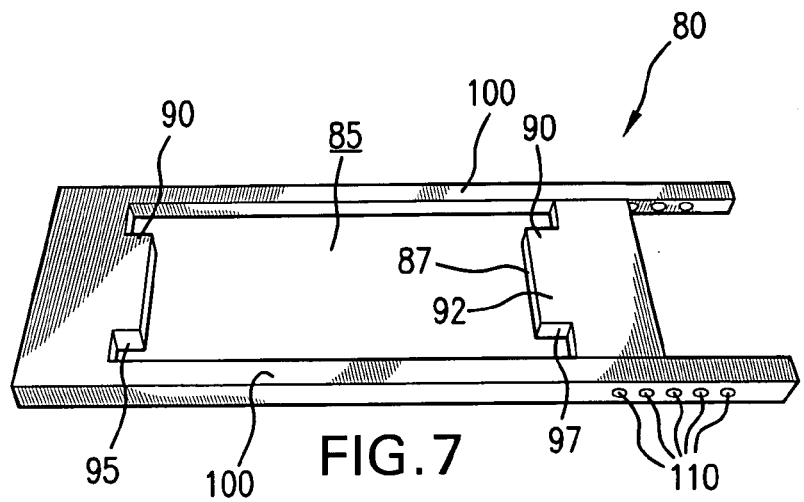
FIG. 7 is a top perspective view of a double wheel chock frame according to one preferred embodiment of this invention.
Figure 9:
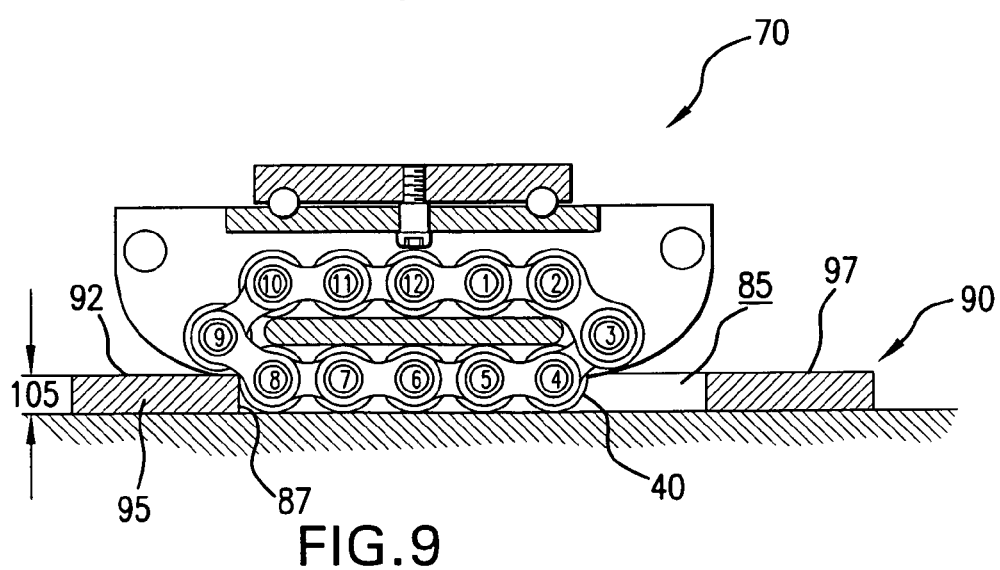
FIG. 9 is a schematic side view of a limited movement roller device and a double wheel chock frame according to one preferred embodiment of this invention.

Another device that will enforce intermittent motion with braking is shown in FIG. 7. Chock frame 80 may be used with a standard roller unit 70 such as shown in FIG. 1 and FIG. 9, a limited movement roller device 20 as described above and/or with any desirable rolling unit or device for moving heavy loads wherein excess motion or range may result in a dangerous condition.

Chock frame 80 shown in FIG. 7 preferably includes a pair of spaced chocks 90 connected between a pair of preferably rigid siderails 100. As shown, the pair of chocks 90 preferably extend inwardly toward each other from the respective opposite attachment points between the pair of siderails 100. A roller unit 70, such as shown in FIG. 1, may be positioned between siderails 100 and is freely moveable between the pair of spaced chocks 90. As described above, roller unit 70 may include a plurality of rollers.

Siderails 100 are preferably spaced approximately equal to a width of roller unit 70. As shown in FIG. 7, the pair of spaced chocks 90 preferably comprise fixed chock 95 and adjustable chock 97. Adjustable chock 97 is preferably adjustable within siderails 100 and, as such, siderails 100 may include a plurality of adjustment apertures 110 for adjusting adjustable chock 97 relative to fixed chock 95. At least one pin or screw (not shown) may be used for adjustably fixing a position of adjustable chock 97 relative to the opposite chock.

The pair of chocks 90 connected between siderails 100 and suitably spaced thereby form a central rattle void 85. Roller unit 70 is preferably freely moveable in a longitudinal direction within rattle void 85. Adjustable chock 97 may be suitably positioned along siderails 100 to create a desired length of rattle void 85, and thus a fixed distance of permissible travel of roller unit 70 within chock frame 80.

According to a preferred embodiment of this invention, each roller 40 within roller unit 70 includes a radius smaller than height 105 of each chock 90. Height 105 of chock 90 is measured between a top surface 92 of chock 90, which is generally horizontal, and a ground surface across which rollers 40 travel. As a result of this spatial relationship, chock 90 is sufficiently low so as to enable adjacent rollers to both abut inner face 87 of chock 90 and compress a top surface 92 of chock 90, thereby resulting in the described braking action.

Figure 8:
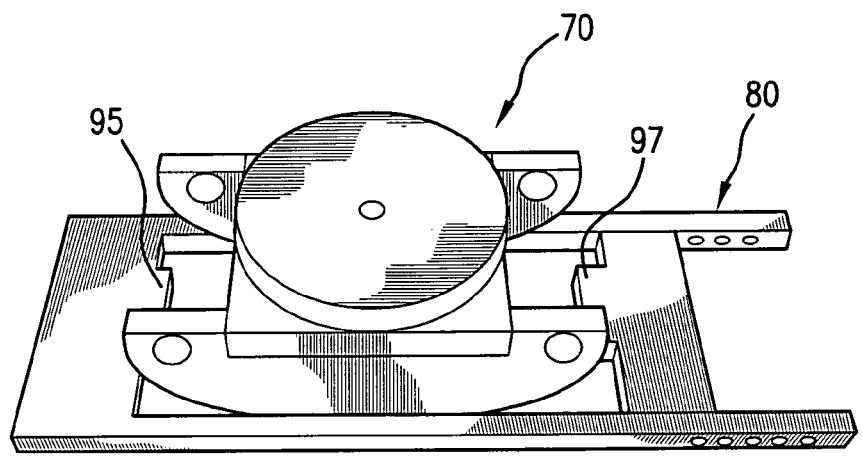
FIG. 8 is a top perspective view of a limited movement roller device according to one preferred embodiment of this invention used in connection with the double wheel chock frame shown in FIG. 5.
Figure 10:
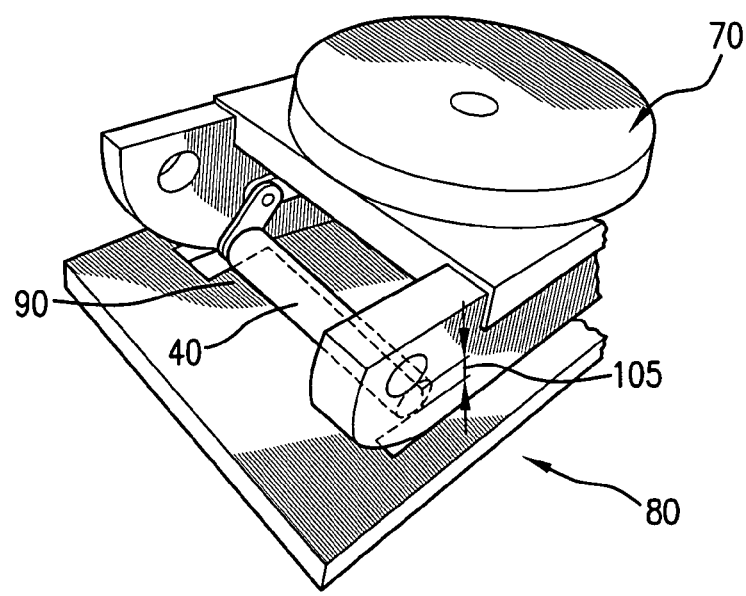
FIG. 10 is a perspective front view of a limited movement roller device and a double wheel chock frame according to one preferred embodiment of this invention.

In operation, chock frame 80 surrounds roller unit 70 with a preset rattle space or void fore and aft as shown in FIG. 8. Roller unit 70 may move forward or rearward until the leading cylindrical roller of the plurality of rollers 40 rolls into contact with the vertical face of the chock as depicted in FIG. 9. As shown in FIG. 9, roller number 8 will push chock frame 80 to the left while chain 50 lowers roller number 9 on top of the wheel chock as illustrated in FIG. 10. This action locks up all rollers 40 and produces a braking action.

When chock frame 80 just begins to move to the left, the operator may kick or otherwise shuffle chock frame 80 forward a full preset distance. The locomotion of roller unit 70 may then continue until rattle void 85 has once again been consumed. Any time the orientation of roller unit 70 needs adjustment, a lever, such as a standard T-handled lever, may be applied to roller unit 70. As roller unit 70 is rotated, siderails 100 of chock frame 80 will cause chock frame 80 to rotate and adopt the new orientation of roller unit 70. By shuffling chock frame 80 along in this manner, a continuous movement of the load may be achieved while insuring against any runaway excursion which will be interrupted within a few inches.

If chock frame 80 is not shuffled forward in a timely fashion and a cylindrical roller 40 is allowed to climb on top of chock frame 80, kicking chock frame 80 forward will not be possible. The trapped chock frame 80 may be released by moving roller unit 70 slightly rearward. If this is not practical, the entire roller unit 70 and chock frame 80 may be rotated 180° using a lever, such as a standard T-handled lever. After rotation, locomotion may be resumed.

Resetting chock frame 80 at the end of each locomotion interval is generally easier and faster than resetting the stop block design of limited movement roller device 20.

Figure 11A:
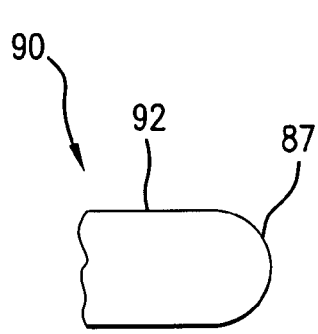
FIG. 11A is a side view of a chock face according to one preferred embodiment of this invention.
Figure 11B:
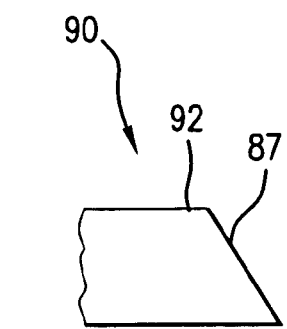
FIG. 11B is a side view of a chock face according to one preferred embodiment of this invention.
Figure 11C:
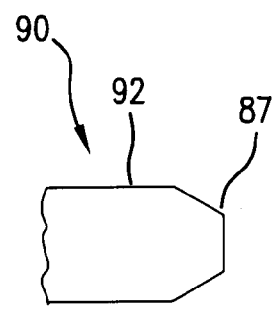
FIG. 11C is a side view of a chock face according to one preferred embodiment of this invention.

When the chock frame 80 is used with wheeled roller skids, several shapes of an inner face 87 of chocks 90 may be adopted: arcuate such as shown in FIG. 11A; wedge shaped such as shown in 11B; or polygonal, such as shown in FIG. 11C. For the prior art roller unit shown in FIG. 1, a vertical flat face is more desirable because such a configuration pushes the frame along a bit before a roller 40 descends on top of chock frame 80.

To transport heavy loads over floors with inclines and imperfections, manufacturers of traditional roller skids provide, for the sake of safety, warnings that admonish users to move slowly, constantly monitor the roller units, strive for absolute cleanliness, and employ holdbacks. The limited movement devices described in this application provide design solutions rather than instructions, recommendations, and warnings. Safety Hierarchy ranks safeguard devices ahead of warnings.

The stop block element 60 is an intrinsic design feature. On the other hand, the chock frame 80 is a supplementary device whose use is elective. Failure to employ the chock frame 80 may have product liability implications arising from the doctrine of Reasonably Foreseeable Use.

The devices described in this application provide an inchmeal motion with full braking every few inches of travel. Further, each concept demands constant resetting which provides an opportunity to reorient the roller units.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A roller system for moving a load a predetermined distance comprising:
    a chock frame including a pair of spaced chocks connected between a pair of rigid siderails, the chock frame defining a central rattle space; and
    a roller unit positioned within the siderails and freely moveable within the rattle space between the pair of spaced chocks, the roller unit having a plurality of rollers, the chock frame moveable relative to the roller unit to reset a position of the chock frame as the roller unit approaches one chock of the pair of spaced chocks.

2. The roller system of claim 1 wherein each roller of the plurality of rollers includes a radius smaller than a height of each chock of the pair of chocks.

3. The roller system of claim 1 wherein the siderails are spaced approximately equal to a width of the roller unit.

4. The roller system of claim 1 wherein the pair of spaced chocks comprise a fixed chock and an adjustable chock.

5. The roller system of claim 4 wherein the siderails include a plurality of apertures for adjusting the adjustable chock of the spaced chocks relative to the fixed chock of the pair of spaced chocks.

6. The roller system of claim 1 wherein at least one chock of the pair of spaced chocks includes an inner face having an arcuate profile.

7. The roller system of claim 1 wherein at least one chock of the pair of spaced chocks includes an inner face having a wedged profile.

8. The roller system of claim 1 wherein at least one chock of the pair of spaced chocks includes an inner face having a polygonal profile.

9. The roller system of claim 1 wherein at least one chock of the pair of spaced chocks includes a vertical inner face.

10. A device for moving a load comprising:
    a pair of parallel siderails;
    a pair of chocks connected between the siderails and spaced opposite each other to form a central rattle space between the pair of chocks and the pair of siderails, the pairs of chocks and siderails together comprising a chock frame;
    a freely moveable roller unit positioned within the rattle space between the chocks and the siderails, the freely moveable unit having a plurality of rollers, each roller of the plurality of rollers having a radius smaller than a height of each chock of the pair of chocks, wherein the chock frame is moveable relative to the roller unit to reset a position of the chock frame as the roller unit approaches one chock of the pair of spaced chocks.

11. The roller system of claim 10 wherein the siderails are spaced approximately equal to a width of the roller unit.

12. The roller system of claim 10 wherein the pair of spaced chocks comprise a fixed chock and an adjustable chock.

13. The roller system of claim 12 wherein the siderails include a plurality of apertures for adjusting the adjustable chock of the spaced chocks relative to the fixed chock of the pair of spaced chocks.

14. The roller system of claim 10 wherein the pair of chocks are adjustable to change a length of the rattle space.

15. The roller system of claim 10 further comprising:
    at least one pin for adjustably fixing a position of one chock of the pair of chocks relative to the opposite chock of the pair of chocks.

16. The roller system of claim 10 wherein the pair of chocks extend inwardly toward each other from respective opposite attachment points of the pair of chocks between the pair of siderails.

17. In combination, a roller unit for moving a load, the roller unit having a frame and a plurality of wheels or rollers, and a device for enforcing intermittent motion comprising:
    a chock frame including a pair of spaced chocks connected between a pair of rigid siderails, the pair of spaced chocks positioned within the siderails wherein the roller unit is placed between the siderails within the chock frame, a distance between the pair of spaced chocks being fixedly adjustable within the siderails, wherein the chock frame is moveable relative to the roller unit to reset a position of the chock frame as the roller unit approaches one chock of the pair of spaced chocks.

18. The combination of claim 17 wherein the siderails are spaced approximately equal to a width of the rolling device.

19. The combination of claim 17 wherein the pair of spaced chocks comprise a fixed chock and an adjustable chock.

20. The combination of claim 17 wherein the siderails include a plurality of apertures for adjusting the adjustable chock of the spaced chocks relative to the fixed chock of the pair of spaced chocks.

* * * * *